US005479892A

United States Patent [19]
Edwards

[11] Patent Number: 5,479,892
[45] Date of Patent: Jan. 2, 1996

[54] VEHICLE SAFETY SEAT FOR PETS

[76] Inventor: Myrtis C. Edwards, P.O. Box 626, Olivehurst, Calif. 95961

[21] Appl. No.: 403,933

[22] Filed: Mar. 14, 1995

[51] Int. Cl.$^6$ .............................. A01K 1/035; B60R 7/00; A47C 1/08
[52] U.S. Cl. ...................... 119/771; 119/792; 297/250.1; 224/275
[58] Field of Search ................................... 119/28.5, 771, 119/792, 793, 907, 19; 297/188.08, 188.09, 250.1, 256.15, 253; 224/275

[56] References Cited

U.S. PATENT DOCUMENTS

| | | |
|---|---|---|
| 2,909,154 | 10/1959 | Thomas . |
| 3,310,034 | 3/1967 | Dishart . |
| 4,512,286 | 4/1985 | Rux . |
| 4,896,630 | 1/1990 | Luce . |
| 5,123,377 | 6/1992 | Edwards . |
| 5,133,294 | 7/1992 | Reid . |
| 5,154,660 | 10/1992 | Snyder . |

Primary Examiner—Todd E. Manahan
Attorney, Agent, or Firm—Richard C. Litman

[57] ABSTRACT

A vehicle safety seat for pets includes four relatively low walls about a central pet seating area, with the walls extending upward from a storage compartment situated below a removable pet seating floor. The pet seating floor may include cushioning and/or padding thereon, which may provide increased grip for a pet occupying the floor area of the seat. The rearward portions of the side walls and the back wall may include strap passages and straps extending therefrom, attachable to a harness or halter which is in turn secured about the upper torso of the pet. The storage compartment area below the floor of the seat includes passages for the vehicle seat belt, to secure the pet safety seat within the vehicle. When the pet and seat are properly secured, the pet seat is positively secured within the vehicle, and the pet is positively secured to the pet seat, thus precluding serious injury to the pet in the event of an accident. The storage compartment provides convenient storage of various articles (pet food, toys, cleaning supplies, etc.) with the pet and seat during travel, in order that all pet related articles will be located in a single convenient area.

20 Claims, 3 Drawing Sheets

VEHICLE SAFETY SEAT FOR PETS

FIELD OF THE INVENTION

The present invention relates generally to safety devices for use in motor vehicles, and more specifically to a safety seat or rest for use by a pet while riding in a motor vehicle. The present safety seat serves as a restraint for the pet, as well as storage of other articles therein and as a platform on which the pet may sit or stand.

BACKGROUND OF THE INVENTION

Traffic and motor vehicle safety has become an increasing concern as traffic density and speeds have increased over the years. Automobile manufacturers have come to realize that "safety sells," and have incorporated numerous safety devices into the vehicles they manufacture. Most states have followed the direction of Federal agencies, in passing laws and regulations requiring the use of such safety features and others as might be appropriate, e.g. the use of child safety seats for infants and small children.

However, many persons also have occasion to carry a house pet or other animal in their vehicle, and heretofore little has been accomplished in providing for the safety of such pets while in a motor vehicle. Such safety concerns are important, as most pet owners can become very attached to a pet, which can be a loyal companion for many years and which life, health, and safety can be very important. While some safety seats and harnesses have been devised for pets, they generally do not achieve the degree of safety provided for human occupants of the vehicle, and are relatively inefficient users of the space within the vehicle.

Accordingly, a need arises for a vehicle safety seat for pets which provides both comfort and safety for a pet seated therein, as well as providing for;storage for various articles therein for the pet. Additional features should be provided, such as a washable mat providing both comfort and good traction for the pet, and an elevated platform or seating area for the pet in order that the pet may view the outside world from his or her seat.

DESCRIPTION OF THE PRIOR ART

Lewis E. Thomas U.S. Pat. No. 2,909,154 issued on Oct. 20, 1959 describes a Tethering Strap Arrangement For Animals, comprising a first strap which secures about the back of a bench type vehicle seat and a second strap which secures between the first seat back strap and the collar of an animal. This arrangement would appear to be hazardous to the pet, due to the single restraining means used about the neck of the animal. Moreover, the animal is free to roam across the vehicle seat, possibly interfering with the driver and causing further potential hazard. No dedicated seating for the animal is disclosed.

Harry S. Dishart U.S. Pat. No. 3,310,034 issued on Mar. 21, 1967 describes a Safety Harness And Collar which in one embodiment includes a fabric basket (column 3, line 30) which rests upon a pad placed upon the vehicle seat. Straps are provided extending from the basket, to secure to the vehicle seat or other vehicle structure. The front of the basket is open, unlike the complete enclosure provided by the present pet safety seat, and the Dishart basket does not provide any storage space beneath the seat bottom. The Dishart fabric material does not provide the structural strength of the present molded seat.

Paul R. Rux U.S. Pat. No. 4,512,286 issued on Apr. 23, 1985 describes a Pet Seat For Automobiles essentially comprising a box having a hinged, openable front panel. The box is secured to a vehicle seat back by a rigid, generally L-shaped bracket over the back of the seat and a tether around the lower portion of the seat back; the existing vehicle seat belts are not used. The box may be suspended above the bottom portion of the seat by adjusting the L-shaped bracket, but the adjustment is time consuming and requires tools, as the bracket is assembled with nuts and bolts. No storage area is disclosed.

Therese G. Luce U.S. Pat. No. 4,896,630 issued on Jan. 30, 1990 describes an Animal Safety Seat Belt comprising a strap which secures about the seat back or head rest support column of a vehicle seat. The opposite end of the strap secures to a halter or harness about the upper torso of the animal. The animal must sit directly upon the seat, as no specialized seating means is disclosed.

Myrtis C. Edwards U.S. Pat. No. 5,123,377 issued on Jun. 23, 1992 describes a Collapsible Vehicle Safety Restraint And Seat For Pets. The seat is quite convenient, in that it may be folded for storage when not in use, but the only retaining means to secure the pet seat to the vehicle seat is by means of two hooks which pass over the back of the vehicle seat. No use is made of the vehicle passenger restraint belt system. Moreover, the relatively light weight and folding nature precludes provision of a storage compartment thereunder. The present seat by the same applicant provides certain advantages over the device of the '377 patent, regarding internal storage and greater security.

Katherine L. Reid U.S. Pat. No, 5,133,294 issued on Jul. 28, 1992 describes a Pet Carrier For Vehicles comprising an open box having a plurality of foldable panels, enabling the box to fold into a substantially planar storage configuration. While the disclosure provides for the securing of a leash about portions of the box to secure a pet to the box, the only mention of securing the box within the vehicle is by passing an existing vehicle seat belt over a portion of the open box, where the pet is situated. The present invention, with its more substantial construction, maintains clearance for the pet in the area occupied by the pet, while still securing the device to the vehicle.

Finally, William A. Snyder et al. U.S. Pat. No. 5,154,660 issued on Oct. 13, 1992 describes a Pet Restraining Apparatus comprising a harness or halter with double attachment points providing for simultaneous securing of the pet to a leash and to an intermediate strap which secures to an automobile seat belt buckle. No pet seat or storage area is disclosed by Snyder et al.

None of the above noted patents, taken either singly or in combination, are seen to disclose the specific arrangement of concepts disclosed by the present invention.

SUMMARY OF THE INVENTION

By the present invention, an improved vehicle safety seat for pets is disclosed.

Accordingly, one of the objects of the present invention is to provide an improved vehicle safety seat for pets which provides at least a low wall which completely surrounds a pet seating area therein.

Another of the objects of the present invention is to provide an improved vehicle safety seat for pets which includes a floor area which is separate from the vehicle seat.

Yet another of the objects of the present invention is to provide an improved vehicle safety seat for pets which provides for vehicle seat belt attachment thereto, which precludes passage of the seat belt through any portion of the area occupied by the pet.

Still another of the objects of the present invention is to provide an improved vehicle safety seat for pets which includes an enclosed storage area beneath a removable floor portion.

A further object of the present invention is to provide an improved vehicle safety seat for pets which storage area and side walls are formed as a single unit with no separate components.

An additional abject of the present invention is to provide an improved vehicle safety seat for pets which may include plural pet restraining straps extending therefrom.

Another object of the present invention is to provide an improved vehicle safety seat for pets which floor portion may include cushioning and/or gripping means for a pet positioned thereon.

A final object of the present invention is to provide an improved vehicle safety seat for pets for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
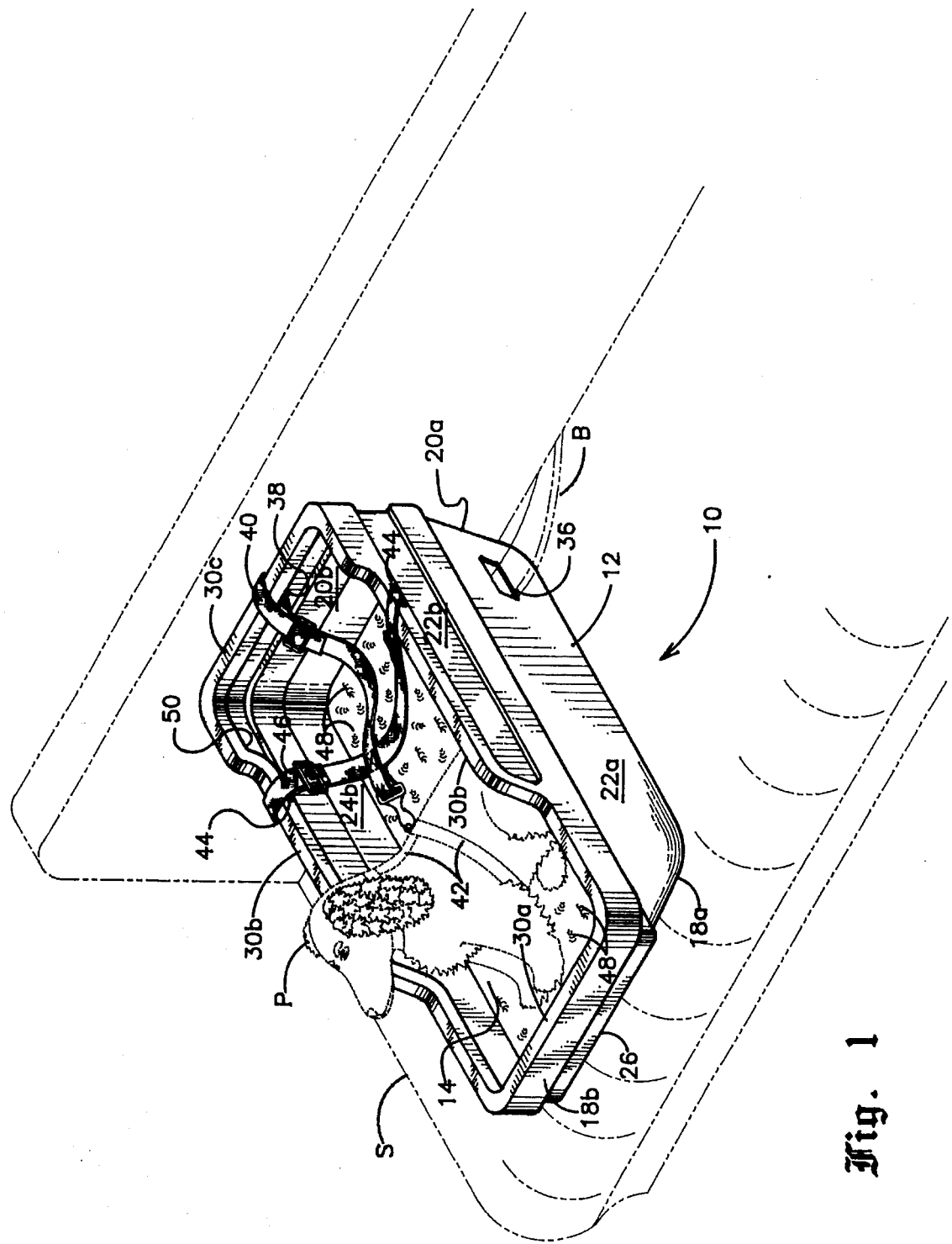
FIG. 1 is perspective view of the present vehicle safety seat for pets, showing the pet seat secured to a vehicle seat and further showing a pet secured within the pet seat.

Referring now particularly to FIG. 1 of the drawings, the present invention will be seen to relate to a vehicle safety seat 10 for pets, providing secure retention of an animal or pet P within a motor vehicle during travel. The pet safety seat 10 comprises two primary components, aside from restraining straps and harness: A base portion 12 and a removable pet seating portion 14.

Figure 2:
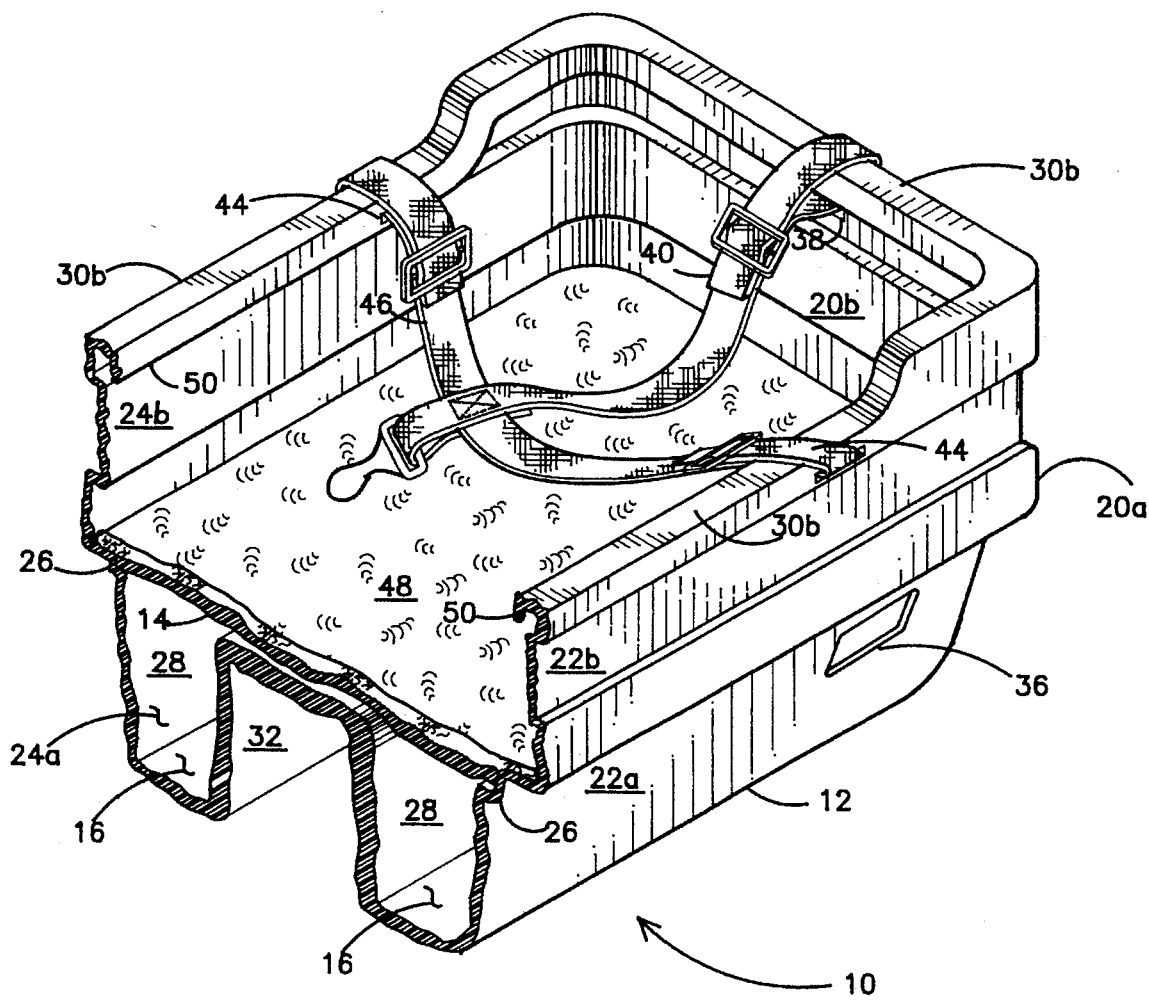
FIG. 2 is a perspective view of the present pet safety seat with the front portion broken away, to show the internal construction of the seat and the storage area therein.

The base portion 12 includes a floor 16 (FIGS. 2 and 3) with four lower walls extending upwardly therefrom, comprising a front wall 18a, a rear wall 20a, and opposite left and right side walls 22a and 24a (FIG. 2). Respective upper walls 18b through 24b extend upwardly from the lower walls 8a through 24a, with an intermediate differentiation line between the lower and upper walls. The upper walls 18b through 24b may be outwardly displaced from the lower walls 18a through 24a, to provide an outwardly extending flange 26 along the intermediate line.

The outwardly extending flange 26 between the lower and upper walls provides peripheral support for the pet seating platform or portion 14, when it is removably installed to the base portion 12. By supporting the seating portion 14 so it is spaced above the floor 16 of the base portion, a storage volume 28 (FIG. 2) is defined between the base portion floor 16, the pet seating portion 14, and the surrounding four lower walls 18a through 24a. (Additional seating platform retaining means, such as inwardly extending dimples or other shapes in the base portion 12, may be used to retain the removable seating panel 14 within the base portion 12, if desired.)

It will be noted that the upper walls 18b through 24b are of different heights, with the forwardmost upper wall 18b and the forward portions of the left and right upper walls 22b and 24b having an upper edge 30a which is lower than the edge 30b of the intermediate portions of the left and right upper walls. In turn, the edge 30b is lower than the upper edge 30c of the rearmost portions of the left and right side walls 22b and 24b, and the upper rear wall 20b. This arrangement provides good lateral security for a pet P secured within the present pet seat 10, and also advantageous mounting of a restraining strap or straps for the pet P, discussed further below. Yet, the relatively lower forward upper edge 30a enables even smaller pets P to have an unobstructed view forward, without the apparently confining effect of a higher forward wall. The placement of the removable pet platform 14 somewhat above the floor 16 of the base portion provides additional elevation for a pet P, to avoid any feeling of confinement for the pet P and to allow the pet to observe the outside world during travel, as most animals seem to enjoy doing.

Support for the platform 14, in addition to the peripheral support provided by the flange 26, may be provided by a generally centrally positioned support column 32 (FIGS. 2 and 3) extending upwardly from the floor 16 of the base portion 12 and two rearwardly disposed pet seating portion support inserts 34 (FIG. 3) formed in the lower rearward wall 20a. The tops of the column 32 and inserts 34 are preferably coplanar with the flange 26, and serve to provide greater structural strength for a pet seating panel or portion 14 removably placed within the base portion 12, particularly for larger and heavier pets P.

Each lower side wall 22a and 24a includes a seat belt slot 36 therethrough. (FIGS. 1 through 3 clearly show the left slot 36 in the left lower wall 22a, and it will be understood that the opposite mirror image wall 24a contains a like slot.) The pet seating panel 14 is removed for access to the interior storage space 28, and the standard vehicle seat belt B is inserted through the slots 36 and secured. (a diagonal shoulder harness strap may either be passed through the appropriate slot 36 with the lap belt portion, or alternatively may be disconnected from the lap belt portion if that option is available, depending upon the vehicle.) This arrangement securely fastens the base portion 12 to the vehicle seat S, as shown in FIG. 1, precluding forward or lateral movement of the base portion 12 of the present vehicle safety seat 10 relative to the seat S or the vehicle in which it is secured. The interior storage space 28 may then be used to store pet related articles (food, a leash, grooming supplies, toys, etc.) therewithin, and closed by placing the pet seating portion or panel 14 thereover.

A pet P is in turn secured within the safety seat 10 and atop the seating panel 14, by means of one or more straps secured to the upper wall or walls of the base portion 12. A central restraining strap passage 38 is provided in the upper rear wall 20b, adjacent the upper edge 30c. A preferably adjustable central restraining strap 40 is secured to the passage 38, and extends forwardly therefrom. This strap 40 has a forward end with attachment means providing for attachment of the strap 40 to a pet harness 42.

Preferably, the upper side walls 22b and 24b are provided with lateral restraining strap passages 44 adjacent the upper edges 30b, with a lateral restraining strap 46 extending across the safety seat 10 between the two passages 44. The central restraining strap 40 is preferably secured substantially to the center of the lateral restraining strap 46; some slack is preferably provided in both the central strap 40 and also the lateral strap 46. This arrangement precludes excessive lateral movement of a pet P within the safety seat 10, and positions the straps 40 and 46 and harness attachment point sufficiently high so as to reduce substantially the change of the pet P becoming entangled therein. Yet, the pet P is allowed sufficient freedom of movement to sit or stand within the seat 10, so the pet may stretch and change positions from time to time.

The pet seating portion 14 is preferably covered in a padding or cushioning material 48 which provides good comfort for a pet P seated thereon, and further provides good traction for the pet P to preclude slippage of the pet P during driving maneuvers. A synthetic wool, washable sheep skin or lamb skin has been found to provide good service, although other materials may be used. Snaps, straps, or other means may be used to removably secure the covering 48 to the seating panel 14.

Figure 3:
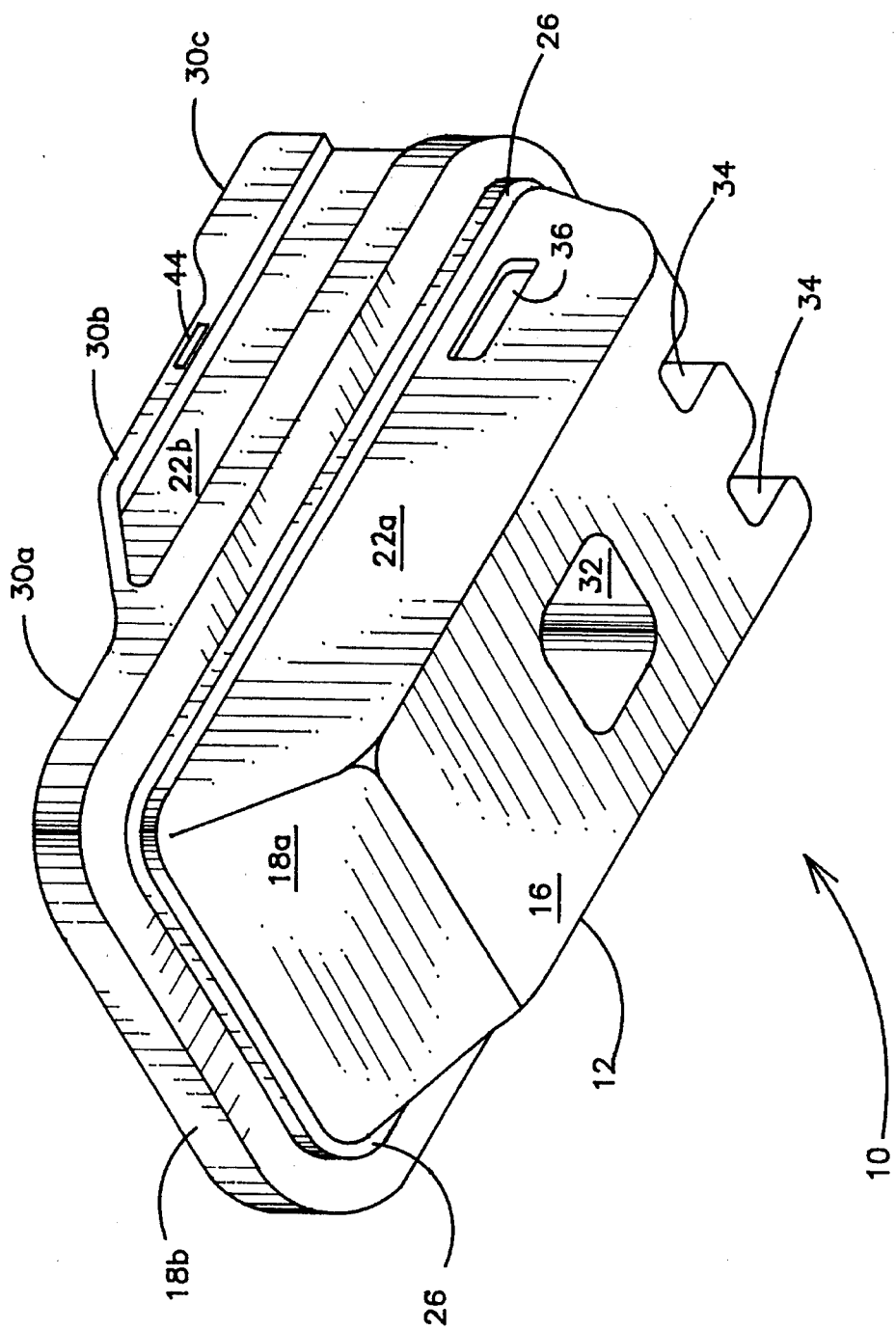
FIG. 3 is a bottom perspective view of the present pet safety seat, showing details of the storage compartment exterior floor.

The present pet safety seat 10 is used by removing the seating panel 14 from the base portion 12 and placing the base portion 12 appropriately on the vehicle seat S. The lower front wall 18a of the base portion 12 may be sloped forwardly and upwardly, as shown in FIGS. 1 and 3, for ease of maneuvering the base portion 12 into the vehicle. The conventional vehicle seat belt B is then passed through the lower seat belt slots 36, and buckled to secure the base portion 12 to the vehicle seat. An inwardly turned flange 50 along the upper edges 30a through 30c of the upper walls 18b through 24, provides for ease of gripping and manipulating the base portion 12, while also providing relatively wide upper edges 30a through 30c to preclude injury to persons or pets thereon. Various pet articles (food, toys, grooming supplies, etc.) may then be placed within the base portion 12, with the pet seating portion 14 installed thereover to contain the pet supplies and articles within the storage volume 28 beneath the pet seating portion 14.

An appropriate harness 42 or other securing means may be placed on the pet P, and the pet P placed on the pet seating portion 14 and secured to the present safety seat 10 by means of attaching the straps 40 and 46 to the harness 42, thereby securing the pet P safely within the vehicle for travel. (It should be noted that the securing of the straps 40/46 to a conventional pet collar is not at all desirable, due to the risk of serious injury to the pet in the event of a frontal collision. A harness, such as harness 42, more evenly distributes any stresses over the upper torso of the pet and lessens the chance of injury.)

During travel, a pet P secured to the present safety seat 10 is elevated somewhat above the bottom portion of the vehicle seat S, and is thus better able to view the sights during travel, while still be restrained safely in the event of a sudden maneuver or collision. The padding material 48 on the pet seating platform or portion 14 provides comfort and good grip or traction thereon for a pet P during vehicle movement. When the trip has been completed, the straps 40 and 46 are detached from the harness 42, and the pet P is removed from the seat 10. The pet platform 14 is then removed from the base portion 12 if removal of the seat 10 from the vehicle is desired, and the seat belt B is unbuckled and removed from the base portion 12 of the seat 10. This is most convenient for overnight trips and the like, as the entire seat 10 may be easily removed from the vehicle and used as a pet bed while away from the vehicle. In any event, the storage volume 28 enables all needed supplies to be kept with the pet safety seat 10, and conveniently carried therein.

When the present seat 10 is no longer needed, it may be easily cleaned by removing the padding material 48 from the seating platform 14 for cleaning. By forming the base portion 12 as a single, unitary molded component (various plastics have been found to be suitable), ease of cleaning the base portion 12 is also provided. The flat, planar configuration of the pet seating portion 14 enables it to be made of a variety of sheet materials; a waterproof Masonite (tm) board has been found to be suitable for durability and economy of replacement if and when needed. Plastics or other materials may also be used for the platform portion 14, as desired.

It is to be understood that the present invention is not limited to the sole embodiment described above, but encompasses any and all embodiments within the scope of the following claims.

I claim:

1. A vehicle safety seat for pets, comprising:

a base portion having a floor with opposite forward and rearward walls and opposite first and second side walls extending upwardly from said floor, with said walls each having an upper edge, an upper portion, a lower portion, and an intermediate differentiation between said upper portion and said lower portion of each of said walls;

a pet seating portion removably disposed within said base portion along said intermediate differentiation of said walls with said upper portion of each of said walls extending upwardly beyond said pet seating portion, and said floor portion, said lower portion of each of said walls, and said pet seating portion defining an enclosed storage volume when said pet seating portion is installed to said base portion;

each said lower portion of said first and second side walls including vehicle seat belt passages therethrough and below said removably disposed pet seating portion, with said passages adapted for the removable installation of a vehicle seat belt therethrough and through said storage volume and beneath said pet seating portion;

said upper portion of at least one of said walls including a restraining strap passage therethrough and adjacent said upper edge, said restraining strap passage adapted for the attachment of a restraining straps thereto and providing for the securing of a pet harness to said vehicle safety seat by means of said restraining strap, whereby;

said vehicle safety seat is secured to the vehicle passenger seat by securing the vehicles seat belt through said vehicle seat belt passages of said base portion, said pet seating portion is installed to said base portion, the pet is secured to the safety seat by said restraining strap secured to said restraining strap passage of said upper portion of at least one of said walls and attached to the pert harness, and the pet is securely and safely restrained in the vehicle for travel.

2. The vehicle safety seat of claim 1 wherein:

said intermediate differentiation of said walls comprises an outwardly extending flange extending around said walls, with said upper portions of said walls being outwardly displaced from said lower portions of said walls and said flange providing peripheral support for said pet seating portion.

3. The vehicle safety seat of claim 1 wherein:

each of said side walls has a forward portion, an intermediate portion, and a rearward portion, and;

said upper edges of said front wall and said forward portion of each of said side walls are lower than said upper edges of said side wall intermediate portions, and said upper edges of said side wall intermediate portions are lower than said upper edges of said side wall rearward portions and said rearward wall.

4. The vehicle safety seat of claim 1 wherein:

said upper portion of each of said side walls and said rear wall each include restraining strap passages therethrough, with a lateral restraining strap extending between said restraining passages of said side walls and a central restraining strap extending from said rear wall, and said central restraining strap is secured substantially to the center of said lateral restraining strap.

5. The vehicle safety seat of claim 1 wherein:

said upper edge of each of said walls includes an inwardly turned flange.

6. The vehicle safety seat of claim 1 wherein:

said floor portion includes a generally centrally disposed pet seating portion support column extending upwardly therefrom and two rearwardly disposed pet seating portion support inserts formed in said lower portion of said rearward wall.

7. The vehicle safety seat of claim 1 wherein:

said lower portion of said forward wall is sloped forwardly and upwardly from said floor.

8. The vehicle safety seat of claim 1 wherein:

said pet seating portion includes an upper surface substantially covered with a padding material and providing a good grip for a pet positioned thereon.

9. The vehicle safety seat of claim 8 wherein:

said padding material is a washable synthetic sheep skin.

10. The vehicle safety seat of claim 1 wherein at least said bottom portion is formed of plastic in a single, unitary construction.

11. A vehicle safety seat for pets and pet harness, comprising in combination:

a vehicle safety seat base portion having a floor with opposite forward and rearward walls and opposite first and second side walls extending upwardly from said floor, with said walls each having an upper edge, an upper portion, a lower portion, and an intermediate differentiation between said upper portion and said lower portion of each of said walls;

a pet seating portion removably disposed within said base portion along said intermediate differentiation of said walls with said upper portion of each of said walls extending upwardly beyond said pet seating portion, and said floor portion, said lower portion of each of said walls, and said pet seating portion defining an enclosed storage volume when said pet seating portion is installed to said base portion;

each said lower portion of said first and second side walls including vehicle seat belt passages therethrough and below said removably disposed pet seating portion, with said passages adapted for the removable installation of a vehicle seat belt therethrough and through said storage volume and beneath said pet seating portion;

said upper portion of at least one of said walls including a restraining strap passage therethrough and adjacent said upper edge, said restraining strap passage adapted for the attachment of a restraining strap thereto;

a pet harness removably attachable to said restraining strap, said pet harness providing for the securing of a pet to said vehicle safety seat by means of said restraining strap, whereby;

said vehicle safety seat is secured to the vehicle passenger seat by securing the vehicle seat belt through said vehicle seat belt passages of said base portion, said pet seating portion is installed to said base portion, the pet is secured to the safety seat by said restraining strap secured to said restraining strap passage of said upper portion of at least one of said walls and attached to said pet harness, and the pet is securely and safely restrained in the vehicle for travel.

12. The vehicle safety seat and pet harness combination of claim 11 wherein:

said intermediate differentiation of said walls comprises an outwardly extending flange extending around said walls, with said upper portions of said walls being outwardly displaced from said lower portions of said walls and said flange providing peripheral support for said pet seating portion.

13. The vehicle safety seat and pet harness combination of claim 11 wherein:

each of said side walls has a forward portion, an intermediate portion, and a rearward portion, and;

said upper edges of said front wall and said forward portion of each of said side walls are lower than said upper edges of said side wall intermediate portions, and said upper edges of said side wall intermediate portions are lower than said upper edges of said side wall rearward portions and said rearward wall.

14. The vehicle safety seat and pet harness combination of claim 11 wherein:

said upper portion of each of said side walls and said rear wall each include restraining strap passages therethrough, with a lateral restraining strap extending between said restraining passages of said side walls and a central restraining strap extending from said rear wall, and said central restraining strap is secured substantially to the center of said lateral restraining strap and includes an extension therefrom providing for the removable attachment of said central restraining strap to said pet harness.

15. The vehicle safety seat and pet harness combination of claim 11 wherein:

said upper edge of each of said walls includes an inwardly turned flange.

16. The vehicle safety seat and pet harness combination of claim 11 wherein:

said floor portion includes a generally centrally disposed pet seating portion support column extending upwardly therefrom and two rearwardly disposed pet seating portion support inserts formed in said lower portion of said rearward wall.

17. The vehicle safety seat and pet harness combination of claim 11 wherein:

said lower portion of said forward wall is sloped forwardly and upwardly from said floor.

18. The vehicle safety seat and pet harness combination of claim 11 wherein:

said pet seating portion includes an upper surface substantially covered with a padding material and providing a good grip for a pet positioned thereon.

19. The vehicle safety seat and pet harness combination of claim 18 wherein:

said padding material is a washable synthetic sheep skin.

20. The vehicle safety seat and pet harness combination of claim 11 wherein:

at least said bottom portion is formed of plastic in a single, unitary construction.

* * * * *